US011539234B2

(12) United States Patent
Stanke (10) Patent No.: US 11,539,234 B2
(45) Date of Patent: Dec. 27, 2022

(54) POWER SUPPLY WITH HIGH AND LOW POWER OPERATING MODES (71) Applicant: MILWAUKEE ELECTRIC TOOL CORPORATION, Brookfield, WI (US)

(72) Inventor: Zachary G. Stanke, Wausau, WI (US)

(73) Assignee: Milwaukee Electric Tool Corporation, Brookfield, WI (US)

( * ) Notice: Subject to any disclaimer, the term of this patent is extended or adjusted under 35 U.S.C. 154(b) by 22 days.

(21) Appl. No.: 17/337,888

(22) Filed: Jun. 3, 2021

(65) Prior Publication Data
US 2021/0384759 A1 Dec. 9, 2021

Related U.S. Application Data (60) Provisional application No. 63/034,715, filed on Jun. 4, 2020.

(51) Int. Cl.
*H02J 9/06* (2006.01)
*H02J 7/00* (2006.01)
(Continued)

(52) U.S. Cl.
CPC .................. *H02J 9/06* (2013.01); *B25F 5/00* (2013.01); *G06F 1/263* (2013.01); *H02J 7/0047* (2013.01);
(Continued)

(58) Field of Classification Search
CPC ............ H02M 3/1584; H02M 1/0045; H02M 1/0032; H02M 3/1566; H02M 1/008;
(Continued)

(56) References Cited

U.S. PATENT DOCUMENTS 6,154,381 A * 11/2000 Kajouke ............. H02M 3/1584
363/65
8,258,766 B1 * 9/2012 Sutardja ................. G05F 1/563
323/284
(Continued)

FOREIGN PATENT DOCUMENTS

JP 2010500853 A 1/2010
JP 2012244862 A * 12/2012
JP 2013188850 A 9/2013

OTHER PUBLICATIONS

International Search Report and Written Opinion for Application No. PCT/US2021/035651 dated Sep. 23, 2021 (10 pages).

Primary Examiner — Ryan Johnson
(74) Attorney, Agent, or Firm — Michael Best & Friedrich LLP (57) ABSTRACT A method for controlling a battery-powered power supply. The method includes generating a first output from a first power supply within the battery-powered power supply. The first output is coupled to an output bus. The method further includes monitoring a voltage of the output bus, and determining, using a controller of the battery-powered power supply, whether the voltage of the output bus is less than a first predetermined level. The method further includes deactivating the first power supply in response to determining that the voltage of the output bus is below the first predetermined level, and generating a second output from a second power supply within the battery-powered power supply. The second output is configured to be coupled to the output bus. The second power supply has a higher output rating than the first power supply.

20 Claims, 5 Drawing Sheets (51) Int. Cl.
  *H02M 3/158* (2006.01)
  *H02M 1/00* (2006.01)
  *G06F 1/26* (2006.01)
  *H02M 3/156* (2006.01)
  *B25F 5/00* (2006.01)

(52) U.S. Cl.
  CPC ......... *H02J 7/0063* (2013.01); *H02M 1/0032* (2021.05); *H02M 3/1566* (2021.05); *H02M 3/1584* (2013.01); *H02J 2207/20* (2020.01)

(58) Field of Classification Search
  CPC ...... H02J 2207/20; H02J 7/0063; H02J 1/102; H02J 7/0047; Y02B 70/10; B25F 5/00; G06F 1/263
  See application file for complete search history.

(56) References Cited

U.S. PATENT DOCUMENTS

| | | |
|---|---|---|
| 2010/0084150 A1 | 4/2010 | Suzuki et al. |
| 2011/0198103 A1 | 8/2011 | Suzuki |
| 2017/0170671 A1 | 6/2017 | Mergener et al. |
| 2018/0191269 A1* | 7/2018 | Knight .................... H02M 7/44 |
| 2021/0399650 A1* | 12/2021 | Ujimaru .............. H02M 1/0032 |

* cited by examiner

POWER SUPPLY WITH HIGH AND LOW POWER OPERATING MODES

RELATED APPLCIATIONS

This application claims the benefit of U.S. Provisional Patent Application No. 63/034,715, filed Jun. 4, 2020, the entire content of which is incorporated by reference herein.

BACKGROUND

Battery powered power tools and other devices continue to become more prevalent on jobsites, residential tool sets, and the like. Additionally, other devices such as smartphones, tablet computers, heater wearable gear (e.g. jackets, hats, gloves, etc.) have also become commonplace. However, when operating on jobsites, or doing projects around a house, there may not be a location to power these devices. Battery powered power supplies may be used to allow for various output voltages to be provided to a user using a rechargeable battery pack, such as a power tool battery pack. The power supplies may be configured to interface with one or more battery types, and can provide one or more voltage outputs to the user, such as 12 VDC, 5 VDC, and the like. Further, the battery powered power supplies may have one or more output types such as USB, USB-C, etc.

Conventional voltage converters (e.g. switching power supplies) for use in battery powered switching-type power supplies are generally placed on the load side of a switch or other activation circuit. The switch or activation circuit is configured to remove power to the voltage converter when the power supply is not in use, due to the parasitic current draw of the voltage converter. This parasitic current draw consumes battery power, and can completely drain a battery over time, even when the power supply is not in use. Similarly, other devices may include an activation circuit that allows a user to activate an output, and thereby the voltage converter, for a period of time, such as two hours.

While a switch or activation circuit can eliminate the parasitic draw of the voltage converter, a user must remember to switch off the voltage converter to prevent the battery from being discharged. Similarly, the use of timers can result in power being shut off to a user prematurely, or to unnecessary discharge of the associated battery.

SUMMARY

Embodiments described herein provide systems and methods for operating a battery powered switching-type power supply to reduce unnecessary parasitic power draw by a voltage converter without requiring the use of a switch, activation circuit, or timer.

In one embodiment, a method provides for controlling a battery-powered power supply. The methods include generating a first output from a first power supply within the battery-powered power supply. The first output is coupled to an output bus. The methods further include monitoring a voltage of the output bus, and determining, via a controller of the battery-powered power supply, whether the voltage of the output bus is less than a first predetermined level. The methods further include deactivating the first power supply in response to determining that the voltage of the output bus is below the first predetermined level and generating a second output from a second power supply within the battery-powered power supply. The second output is configured to be coupled to the output bus. The second power supply has a higher output power rating than the first power supply.

Battery-powered power supplies described herein include a voltage converter including a first power supply and a second power supply. The first power supply and the second power supply are configured to provide an output to a common output bus. The voltage converter is configured to receive power from a removable battery pack. The battery-powered power supplies further include a voltage sensor coupled to the output bus and configured to sense a voltage on the output bus, a current sensor configured to sense a current flowing through the output bus, and a controller. The controller is configured to monitor a voltage of the output bus during an activation period of the first power supply and determine whether the voltage of the output bus is less than a predetermined voltage level. The controller is further configured to deactivate the first power supply and activate the second power supply in response to determining that the voltage is less than the predetermined voltage level.

In another embodiment, a method provides for controlling a battery-powered power supply. The methods include generating a first output from a first power supply within the battery-powered power supply. The first output is coupled to an output bus. The methods further include monitoring a power output at the output bus, and determining, via a controller of the battery-powered power supply, whether the power output at the output bus is greater than a first predetermined level. The methods further include deactivating the first power supply in response to determining that the power output at the output bus is greater than the first predetermined level and generating a second output from a second power supply within the battery-powered power supply. The second output is configured to be coupled to the output bus. The second power supply has a higher output power rating than the first power supply.

Before any embodiments are explained in detail, it is to be understood that the embodiments are not limited in its application to the details of the configuration and arrangement of components set forth in the following description or illustrated in the accompanying drawings. The embodiments are capable of being practiced or of being carried out in various ways. Also, it is to be understood that the phraseology and terminology used herein are for the purpose of description and should not be regarded as limiting. The use of "including," "comprising," or "having" and variations thereof are meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings.

In addition, it should be understood that embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic-based aspects may be implemented in software (e.g., stored on non-transitory computer-readable medium) executable by one or more processing units, such as a microprocessor and/or application specific integrated circuits ("ASICs"). As such, it should be noted that a plurality of hardware and software-based devices, as well as a plurality of different structural components, may be utilized to implement the embodiments. For example, "servers," "computing devices," "controllers," "processors," etc., described in the specification can include one or more processing units, one or more computer-readable medium modules, one or more input/output interfaces, and various connections (e.g., a system bus) connecting the components.

Relative terminology, such as, for example, "about," "approximately," "substantially," etc., used in connection with a quantity or condition would be understood by those of ordinary skill to be inclusive of the stated value and has the meaning dictated by the context (e.g., the term includes at least the degree of error associated with the measurement accuracy, tolerances [e.g., manufacturing, assembly, use, etc.] associated with the particular value, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10%, or more) of an indicated value.

It should be understood that although certain drawings illustrate hardware and software located within particular devices, these depictions are for illustrative purposes only. Functionality described herein as being performed by one component may be performed by multiple components in a distributed manner. Likewise, functionality performed by multiple components may be consolidated and performed by a single component. In some embodiments, the illustrated components may be combined or divided into separate software, firmware and/or hardware. For example, instead of being located within and performed by a single electronic processor, logic and processing may be distributed among multiple electronic processors. Regardless of how they are combined or divided, hardware and software components may be located on the same computing device or may be distributed among different computing devices connected by one or more networks or other suitable communication links. Similarly, a component described as performing particular functionality may also perform additional functionality not described herein. For example, a device or structure that is "configured" in a certain way is configured in at least that way but may also be configured in ways that are not explicitly listed.

Other aspects of the embodiments will become apparent by consideration of the detailed description and accompanying drawings.

DETAILED DESCRIPTION

The below embodiments describe battery-powered power supplies configured to eliminate, or supplement, the requirement that the user provide an input to turn the battery powered power supply on and/or off by incorporating a low-power power supply in addition to a high-power power supply that can be automatically operated based on a sensed load.

Figure 1:
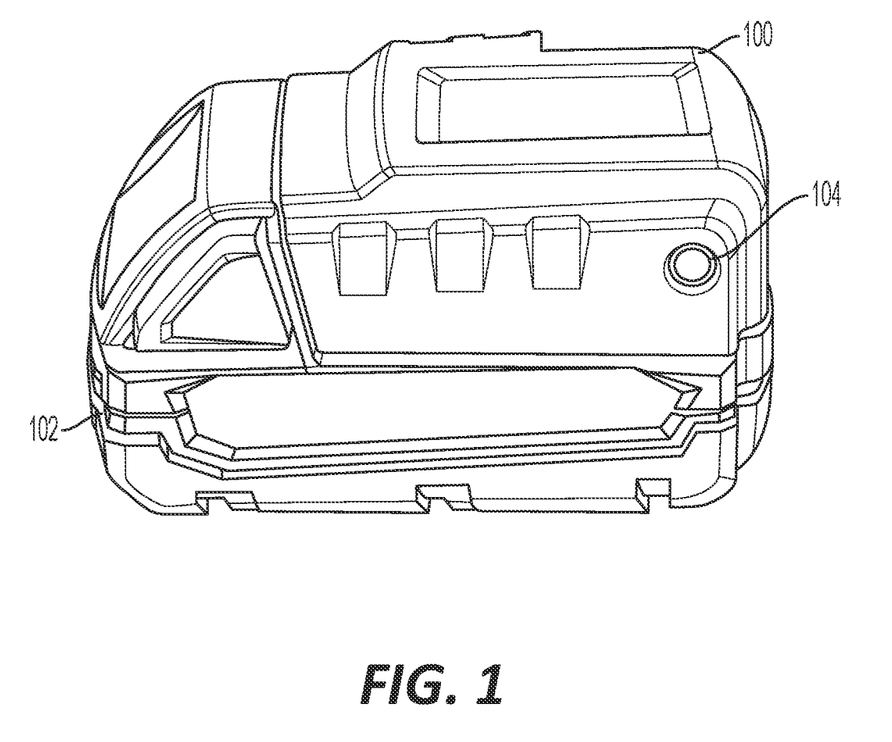
FIG. 1 is a side view of a battery-powered power supply, according to some embodiments.

FIG. 1 illustrates a side view of a battery-powered power supply 100. The battery-powered power supply 100 is shown as being coupled to a battery pack 102. In some embodiments, the battery pack 102 may be a rechargeable power tool battery pack. The battery pack 102 may be an 18 VDC battery pack, a 12 VDC battery pack, a 5 VDC battery pack, or other voltage type battery pack. In some embodiments, the battery pack 102 contains one or more battery cells in various series and/or parallel combinations to provide the desired output voltage. The battery cells may be lithium-ion (Li-Ion) battery cells having a chemistry of, for example, lithium-cobalt (Li—Co), lithium-manganese (Li—Mn), or Li—Mn spinel. In other embodiments, the battery cells may have other suitable lithium or lithium-based chemistries. In still other embodiments, the battery cells may have other battery chemistries, such as sodium-based chemistries, Nickel-Cadmium chemistries, lead-acid chemistries, alkaline battery chemistries, and the like. The battery-powered power supply 100 may further include a first output connector 104. The first output connector 104 may be a dedicated connection type. However, various connection types are contemplated. In some embodiments, the first output connector 104 is a 12 VDC output. Voltages of more than 12 VDC or less than 12 VDC are also contemplated.

Figure 2:
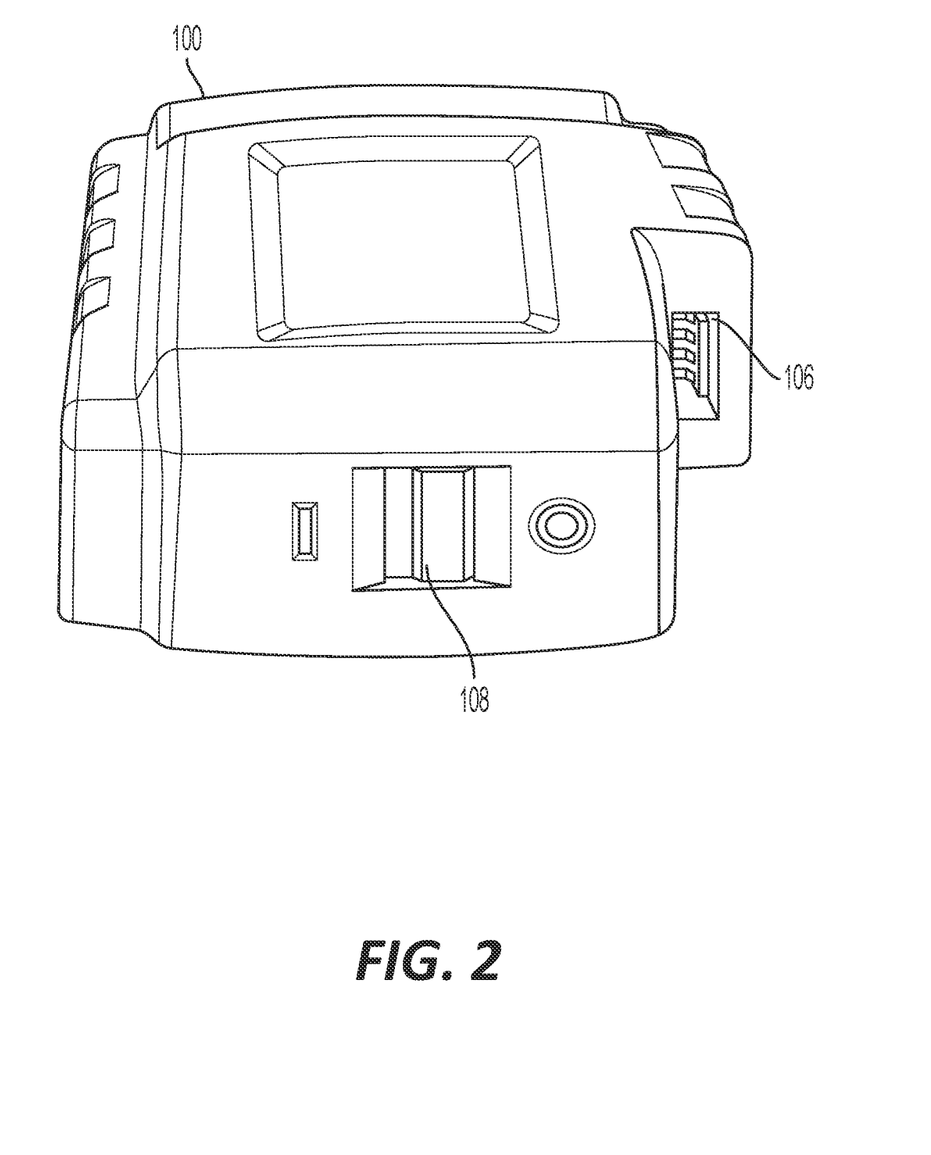
FIG. 2 is a rear view of the battery-powered power supply of FIG. 1, according to some embodiments.

FIG. 2 illustrates a rear view of the battery-powered power supply 100. As shown in FIG. 2, the battery-powered power supply 100 includes a second output connector 106. In some embodiments, the second output connector 106 is a USB-type connector. In other embodiments, the second output connector 106 may be other types of connector, such as USB-C, Firewire, Micro-USB, Mini-USB, or the like. The second output connector 106 may be configured to output a 5 VDC output. However, outputs of more than 5 VDC or less than 5 VDC are also contemplated. The battery-powered power supply 100 is further shown to include a power switch 108, which is configured to turn the battery-powered power supply 100 ON or OFF.

Figure 3:
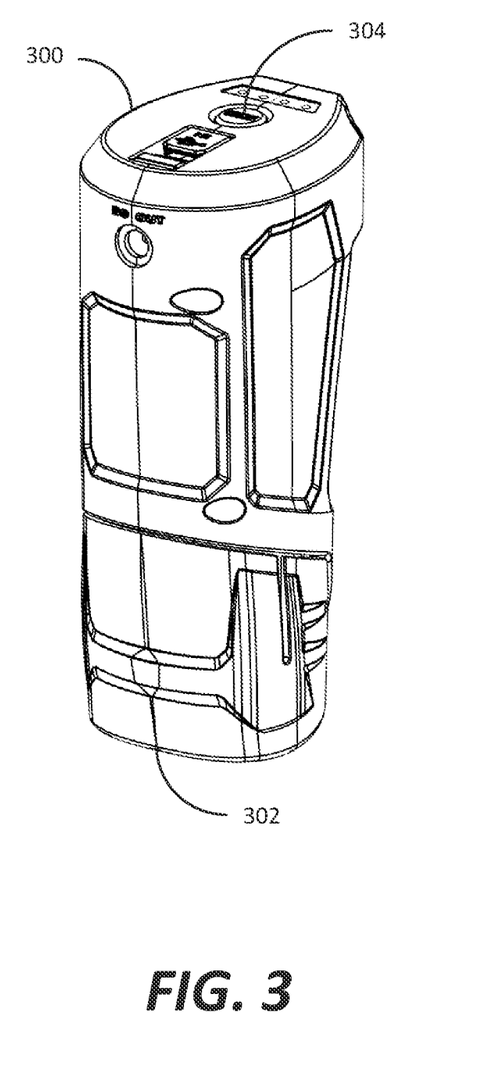
FIG. 3 is a perspective view of an alternative battery-powered power supply, according to some embodiments.

FIG. 3 illustrates an alternate embodiment of a battery-powered power supply 300. The battery-powered power supply 300 may be configured to interface with stick-type battery-pack 302, such as an M12® battery pack from Milwaukee Tool. Similar to the battery-powered power supply 100 described above, the battery-powered power supply 300 may include a user interface 304 and one or more outputs, similar to those described above. The user interface 304 may be coupled to a controller and configured to activate an output of the battery-powered power supply 300.

Figure 4:
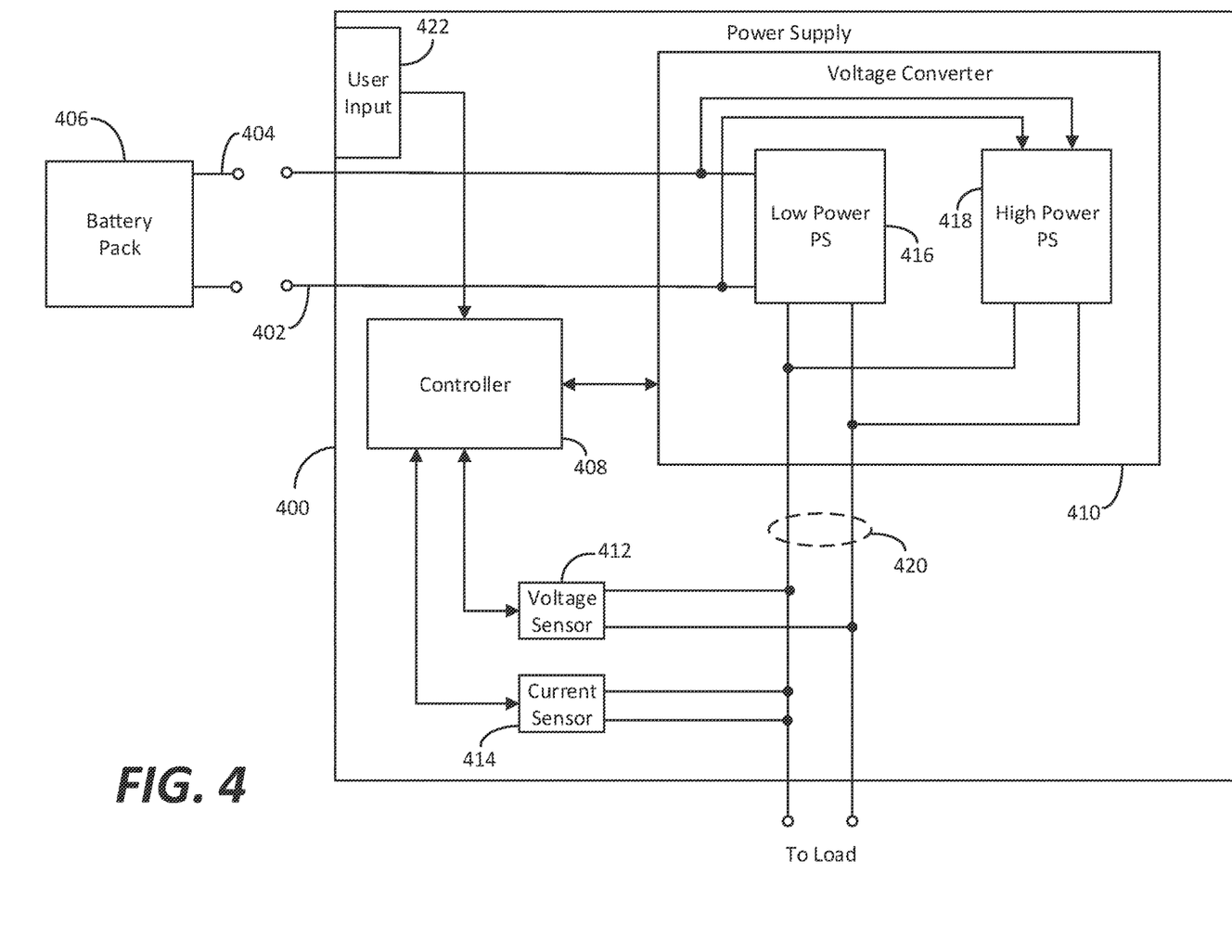
FIG. 4 is a block diagram of a battery-powered power supply, according to some embodiments.

FIG. 4 illustrates a block diagram of a battery-powered power supply 400. In some embodiments, the battery-powered power supply 400 is similar to one of the battery-powered power supplies 100, 300 described above. However, other battery-powered power supply types are also contemplated. The battery-powered power supply 400 includes terminals 402 for connecting to battery terminals 404 of a battery pack 406. The battery pack 406 may be a battery pack similar to those described above. In one embodiment, the battery pack 406 is a removable battery pack. In other embodiments, the battery pack 406 is a non-removable battery pack. The battery-powered power supply 400 further includes a controller 408, a voltage converter 410, a voltage sensor 412, and a current sensor 414.

In some embodiments, the controller 408 is configured to control the one or more components of the battery-powered power supply 400, such as the voltage converter 410, the voltage sensor 412, and or the current sensor 414. The controller 408 may be or include a processing circuit such as an application specific integrated controller (ASIC), a field programmable gate array (FPGA), a programmed microprocessor, or other applicable controller types. In some embodiments, the controller 408 may include a memory device, such as a random-access memory (RAM), read only memory (ROM), Flash memory, or another non-transitory computer readable medium.

The voltage converter 410 is configured to convert a voltage of the battery pack 102 (e.g. 18 VDC, 12 VDC) to a desired voltage level or levels, such as 12 VDC, −12 VDC, 5 VDC, −5 VDC, 3.3 VDC, etc. As shown in FIG. 4, the voltage converter 410 includes a low-power power supply (PS) 416 and a high-power power supply (PS) 418. Both the low-power PS 416 and the high-power PS 418 are configured to output a desired voltage via the output bus 420. In some embodiments, the low-power PS 416 and/or the high-power PS 418 are coupled to the output bus 420 via a resistor. The output voltages of both the low-power PS 416 and the high-power PS 418 are the same. In some examples, different voltages may be output by the low-power PS 416 and the high-power PS 418 as well as common voltages. The low-power PS 416 is configured to output the desired output voltage with a lower available amount of current (i.e. lower power output). For example, the low-power PS 416 may be configured to have a maximum current output of 10 mA. However, output current values of more than 10 mA or less than 10 mA are also contemplated. In contrast, the high-power PS 418 is configured to output the desired output voltage with a higher available amount of current (i.e. a higher power output). For example, the high-power PS 418 may be configured to have a maximum current output of 500 mA. However, output current values of more than 500 mA or less than 500 mA are also contemplated.

The low-power PS 416 is configured to require a minimal operating current when no load is coupled to the output bus 420 of the power supply 400. For example, the low-power PS 416 may be configured to draw less than 1 mA of current when there is no load connected to the power supply 400. This reduced parasitic current draw reduces the discharge of the battery pack 406. Further, by maintaining a minimal amount of output power from the low-power PS 416, the high-power PS 418 may quickly be activated when there is a load connected to the power supply 400 requiring additional output power. Additionally, the low-power PS 416 may provide power to the controller 408 when the battery pack 406 is coupled to the power supply 400. In some embodiments, the controller 408 may be configured to operate in a low power mode when the only the low-power PS 416 is operating.

In some embodiments, the low-power PS 416 and high-power PS 418 are controlled by the controller 408 to provide an output via the output bus 420. For example, the controller 408 may provide a signal to the voltage converter 410 to activate either the low-power PS 416 or the high-power PS 418 in response to one or more conditions being determined by the controller 408, such as those described in more detail below.

The voltage sensor 412 is configured to sense a voltage on the output bus 420 representative of the output of the voltage converter 410. The voltage sensor 412 may further be configured to provide a signal representative of the sensed voltage to the controller 408. The current sensor 414 is configured to sense a current provided to a load via the output bus 420. The current sensor 414 may further be configured to provide a signal representative of the sensed current to the controller 408.

The power supply 400 may further include user input 422. The user input 422 may be a switch or other user input to allow a user to selectively control the connection of the battery pack to the circuitry (i.e. voltage converter 410) of the power supply 400. In some embodiments, an input may be provided to the controller 408 to power on the voltage converter 410.

Figure 5:
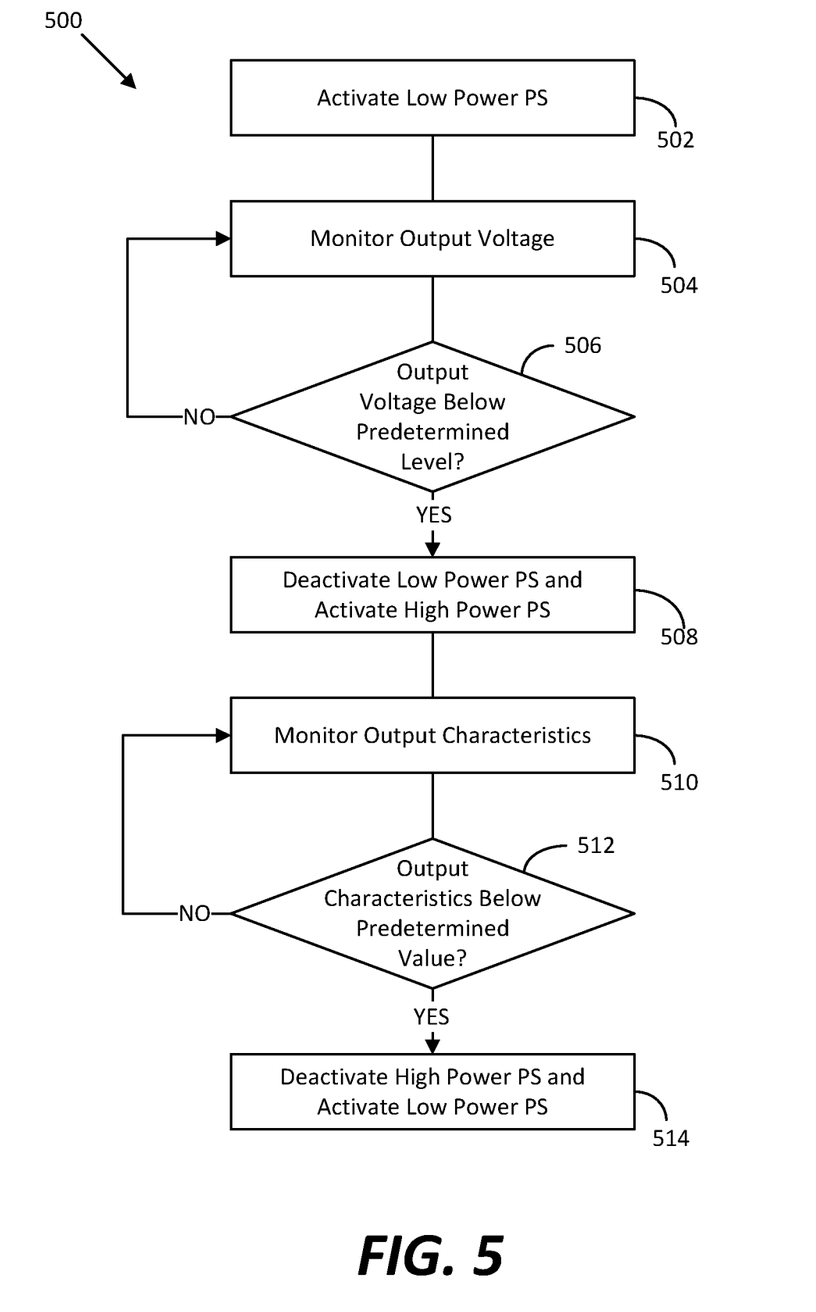
FIG. 5 is a flow chart illustrating a process for controlling a battery-powered power supply, according to some embodiments.

FIG. 5 is a flowchart illustrating a process 500 for controlling the output of a power supply. In some embodiments, the process 500 is performed using the power supply 400 described above. At process block 502, the controller 408 activates the low-power PS 416. In some embodiments, the controller 408 may activate the low-power PS 416 in response to receiving an indication that a battery pack has been coupled to the power supply 400. In other embodiments, the controller 408 may activate the low-power PS 416 in response to receiving a signal from the user input 422. Activating the low-power PS 416 causes the low-power PS to provide an output via the output bus 420, as described above. At process block 504, the controller 408 monitors an output voltage provided to a load. In some embodiments, the voltage sensor 412 provides a signal representative of a voltage sensed on the output bus 420 to the controller 408.

At process block 506 the controller 408 determines if the output voltage is below a predetermined level. In some embodiments, the predetermined level may a 20% reduction in voltage below the nominal voltage level provided to the output bus 420. For example, wherein the nominal output voltage of the voltage converter 410 is 12V, the predetermined level may be 9.6V (12V-20%). However, predetermined levels or more than 20% or less than 20% are also contemplated. The drop in output voltage may be due to a load being connected to the output bus 420 which requires more power than is able to be provided by the low-power PS 416. Thus, the drop in voltage is indicative of a load being connected to the output bus 420. Due to the limited capacity of the low-power PS 416 to provide the required power, the voltage output from the low-power PS 416 will begin to drop. In response to determining that the output voltage is not below the predetermined value, the controller 408 continues to monitor the output voltage at process block 504.

In response to determining that the output voltage is below the predetermined value at process block 506, the controller 408 deactivates the low-power PS 416 and activates the high-power PS 418 at process block 508. While the above embodiment describes deactivating the low-power PS 416 in response to an output voltage being below a predetermined threshold, other parameters, such as output power or output current, may also be used to deactivate the low-power PS 416. The output power may be calculated by the controller 408 as a function of the output voltage and output current. For example, if the output power is determined to exceed a predetermined threshold, the low-power PS 416 may be deactivated by the controller 408. Examples of predetermined values of increased power may be a 10% increase over a no-load power draw. However, increases of more than 10% or less than 10% are also contemplated. Other examples of predetermined values of power may be 120 mW threshold. However, values of more than 120 mW or less than 120 mW are also contemplated. In other embodiments, an input power or current may also be monitored to determine a power draw of the power supply 400. For example, an increase in determined or sensed input power or current can indicate that the low-power PS 416 should be deactivated, and the high-power PS 418 be activated. For example, if the input current or power exceeds a predetermined threshold, such as 10% of no-load current or power, the controller 408 can deactivate the low-power PS 416 and activate the high-power PS 418 at process block 508. Predetermined thresholds of more than 10% or less than 10% are also contemplated.

In some embodiments, the low-power PS 416 provides power to the high-power PS 418 in response to a signal received from the controller 408. In other embodiments, the controller 408 provides a signal to the voltage converter 410, which then diverts output power from the low-power PS 416 to the high-power PS 418 to turn on the high-power PS 418 prior to deactivating the low-power PS 416. In further embodiments, the low-power PS 416 may provide power to control circuitry within the voltage converter 410, thereby allowing the voltage converter 410 to activate the high-power PS 418 and provide power from the battery pack to the high-power PS 418. In some examples, the low-power PS 416 may remain activated and the high-power PS 418 is also activated to supplement the available output power.

At process block 510, the controller 408 monitors one or more output characteristics of the output bus 420. In one embodiment, the controller 408 monitors an output current of the voltage converter 410. In some embodiments, the current sensor 414 provides a signal representative of the current flowing to the load via the output bus 420 to the controller 408. At process block 512, the controller 408 determines if the output current is below a predetermined value. In some embodiments, the predetermined level is a current threshold value. For example, the predetermined level may be 10 mA. However, predetermined levels of more than 10 mA or less than 10 mA are also contemplated. In some examples, the predetermined levels may be equal to a maximum current output level of the low-power PS 416. In other examples, the controller 408 may monitor an output power at the output bus 420, as described above. The controller 408 may determine whether the power is below a predetermined threshold, such as 10% of no-load power. In other examples, the predetermined value may be a power value, such as 120 mW. However, power values of more than 120 mW or less than 120 mW are also contemplated.

The predetermined level is configured to represent a substantial reduction, or absence, of the load. Thus, the drop in current or power may indicate a removal of the load from the output bus 420. In other embodiments, the drop in current or power may indicate a reduced load, such as when an external device being charged via the output bus 420 is fully or nearly fully charged, requiring little or no current from the power supply 400. In response to determining that the output current or power is not below the predetermined value, the controller 408 continues to monitor the output current at process block 510.

In response to determining that the output current or power is below the predetermined value, the controller 408 deactivates the high-power PS 418 and re-activates the low-power PS 416 to avoid unnecessary battery discharge caused by powering the high-power PS 418. The controller 408 then resumes monitoring the output voltage level at process block 504.

Thus, embodiments described herein provide, among other things, battery-powered power supplies that include a low-power power supply in addition to a high-power power supply that can be automatically operated based on a sensed load. Various features and advantages are set forth in the following claims.

What is claimed is:

1. A method for controlling a battery-powered power supply, the method comprising:
   generating a first output from a first power supply within the battery-powered power supply, the first output being coupled to an output bus;
   monitoring a voltage of the output bus;
   determining, using a controller of the battery-powered power supply, whether the voltage of the output bus is less than a first predetermined level;
   deactivating, in response to determining that the voltage of the output bus is below the first predetermined level, the first power supply; and
   generating a second output from a second power supply within the battery-powered power supply, the second output being configured to be coupled to the output bus, wherein the second power supply has a higher output power rating than the first power supply.

2. The method of claim 1, further comprising:
   monitoring a current of the output bus;
   determining, via the controller of the battery-powered power supply, whether the current is less than a second predetermined value; and
   deactivating, in response to determining that the current is less than the second predetermined value, the second power supply; and
   reactivating the first power supply.

3. The method of claim 1, further comprising:
   monitoring a current of an input to the battery-powered power supply;
   determining, via the controller of the battery-powered power supply, whether the current is less than a second predetermined value; and
   deactivating, in response to determining that the current is less than the second predetermined value, the second power supply; and
   reactivating the first power supply.

4. The method of claim 1, wherein the battery-powered power supply is powered by a rechargeable power tool battery pack.

5. The method of claim 1, wherein the first power supply has a no-load current draw of 1 mA or less.

6. The method of claim 1, wherein the first power supply has a maximum output current of at least 10 mA.

7. The method of claim 1, wherein the second power supply has a maximum output current of at least 500 mA.

8. A battery-powered power supply comprising:
   a voltage converter including:
      a first power supply, and
      a second power supply,
      wherein the first power supply and the second power supply are configured to provide an output to a common output bus, and
      wherein the voltage converter is configured to receive power from a removable battery pack;
   a voltage sensor coupled to the output bus and configured to sense a voltage of the output bus;
   a current sensor configured to sense a current though the output bus; and
   a controller configured to:
      monitor a voltage of the output bus during an activation period of the first power supply,
      determine whether the voltage of the output bus is less than a predetermined voltage level,
      deactivate the first power supply and activate the second power supply in response to determining that the voltage is less than the predetermined voltage level.

9. The power supply of claim 8, wherein the controller is further configured to:
monitor the current through the output bus during an activation period of the second power supply;
determine whether the current flowing though the output bus is less than a predetermined current level; and
deactivating, in response to determining that the current is less than the predetermined current level, the second power supply and activating the first power supply.

10. The power supply of claim 9, wherein the predetermined current level is 10 mA.

11. The power supply of claim 8, wherein the second power supply has a higher output power rating than the first power supply.

12. The power supply of claim 8, wherein the removable battery pack is a power tool battery pack.

13. The power supply of claim 8, wherein the first power supply has a no-load current draw of 1 mA or less.

14. The power supply of claim 8, wherein the second power supply has a maximum output current of at least 500 mA.

15. A method for controlling a battery-powered power supply, the method comprising:
generating a first output from a first power supply within the battery-powered power supply, the first output being coupled to an output bus;
monitoring a power output at the output bus;
determining, using a controller of the battery-powered power supply, whether the power output at the output bus is greater than a first predetermined level;
deactivating, in response to determining that the power output at the output bus is greater than the first predetermined level, the first power supply; and
generating a second output from a second power supply within the battery-powered power supply, the second output being coupled to the output bus,
wherein the second power supply has a higher output power rating than the first power supply.

16. The method of claim 15, wherein the first predetermined level is at least 120 mW.

17. The method of claim 15, wherein the first power supply has a maximum output current of at least 10 mA.

18. The method of claim 15, wherein the second power supply has a maximum output current of at least 500 mA.

19. The method of claim 15, wherein the battery-powered power supply is powered by a rechargeable power tool battery pack.

20. The method of claim 15, further comprising:
monitoring the power of the output bus;
determining, using a controller of the battery-powered power supply, whether the power output at the output bus is less than the first predetermined level;
deactivating, in response to determining that the power output at the output bus is less than the first predetermined level, the second power supply; and
reactivating the first power supply.

* * * * *